Aug. 15, 1933.  S. H. OWENS  1,922,632
MOVABLE ABUTMENT FOR CONTAINER VEHICLES
Original Filed April 28, 1932   3 Sheets-Sheet 1
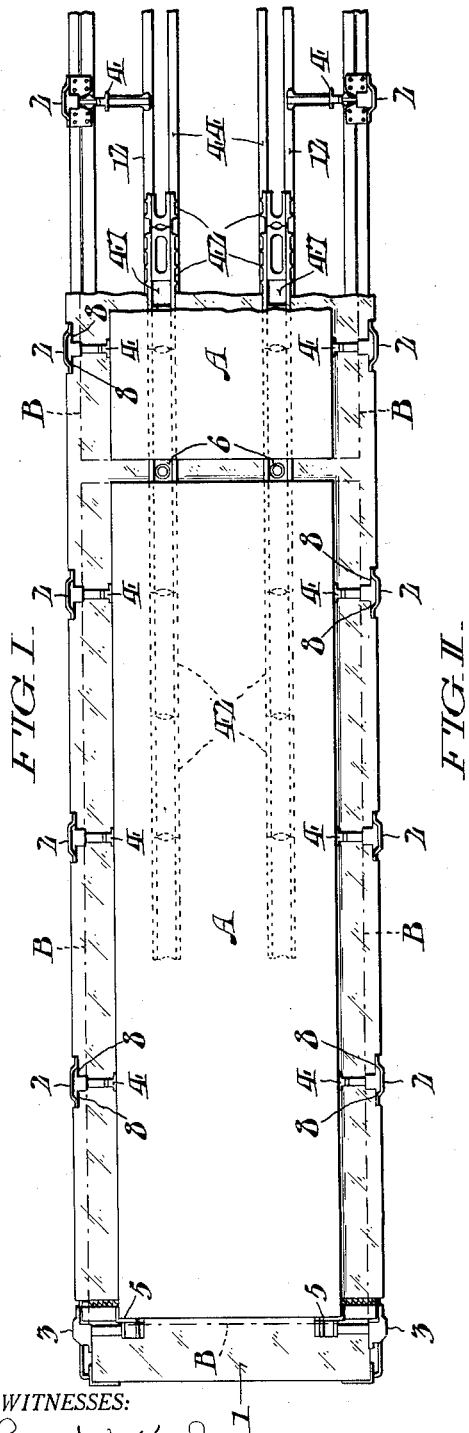
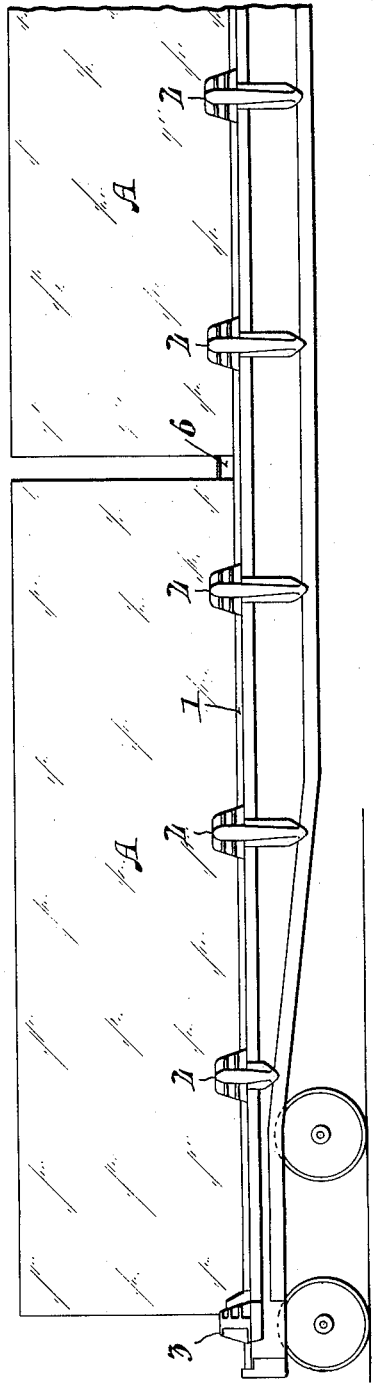
WITNESSES:
INVENTOR:
Samuel H. Owens
BY
ATTORNEYS.

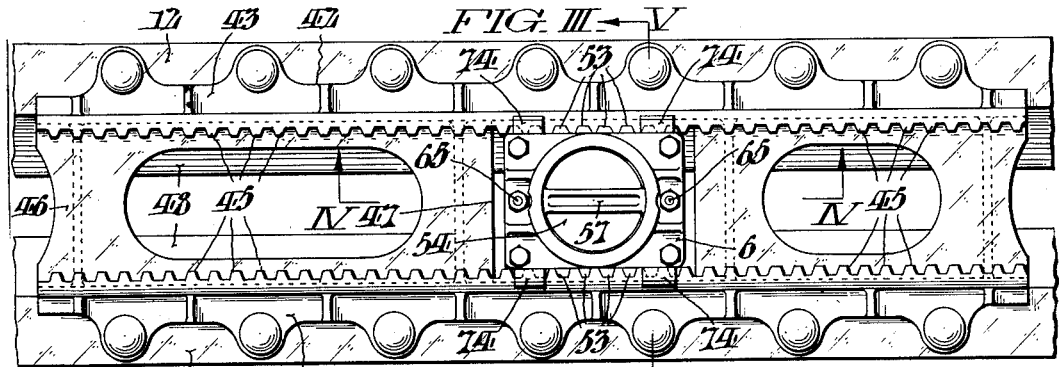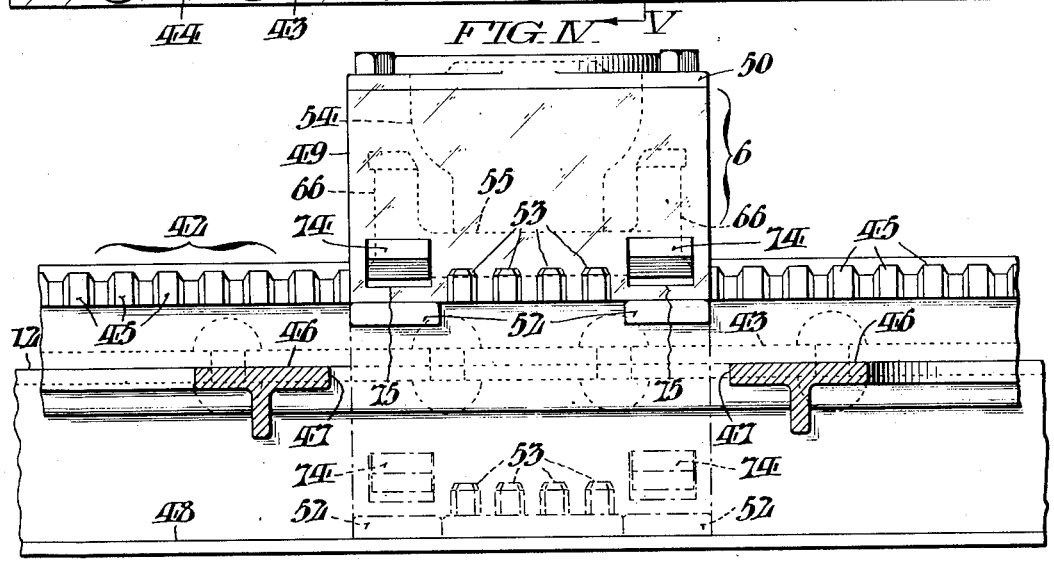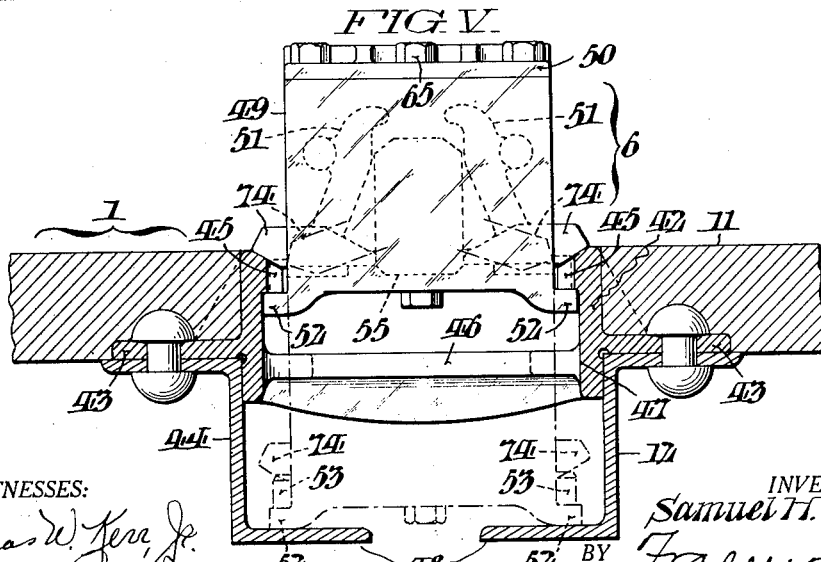

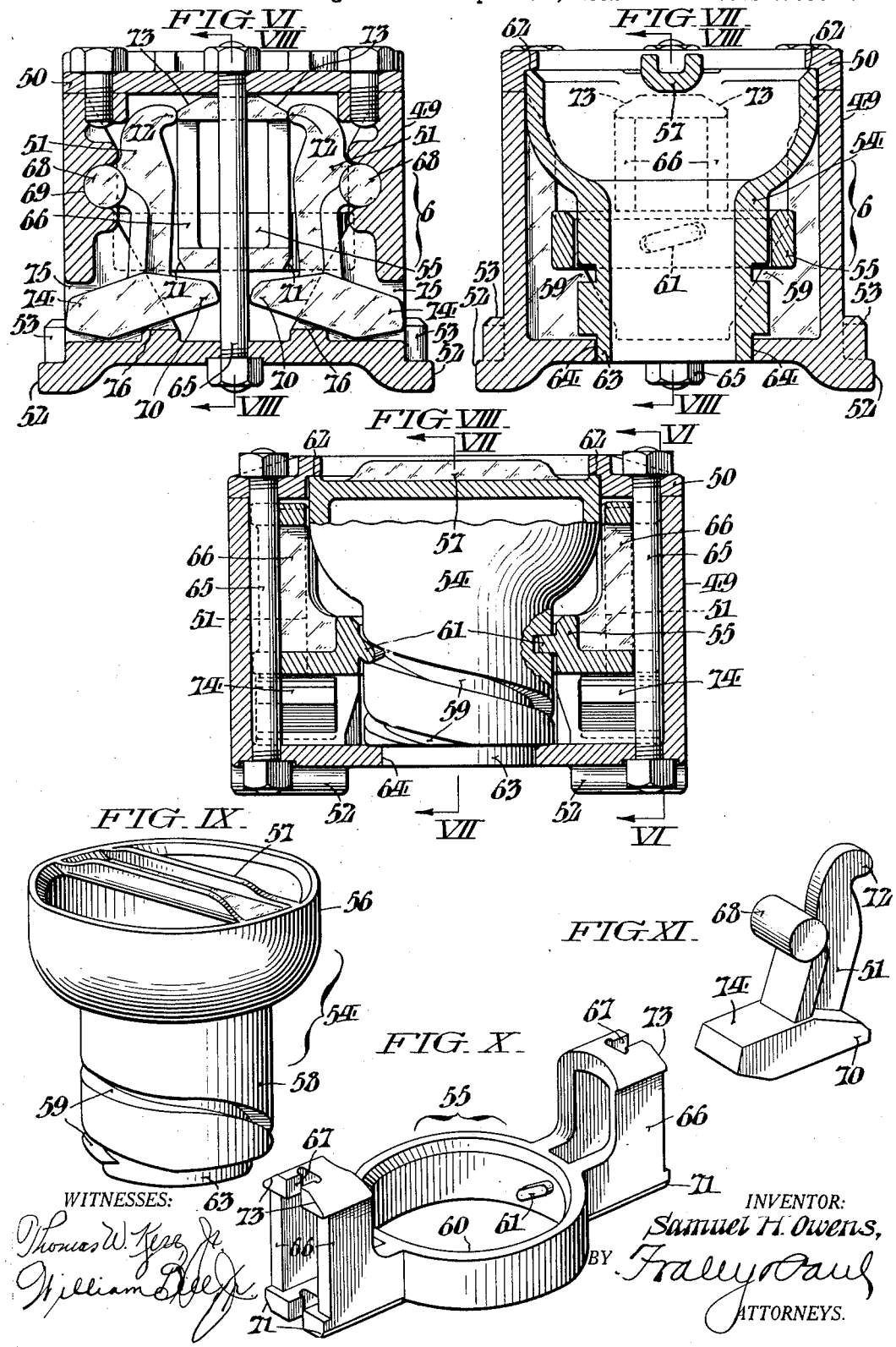

Patented Aug. 15, 1933

1,922,632

UNITED STATES PATENT OFFICE 1,922,632

MOVABLE ABUTMENT FOR CONTAINER VEHICLES

Samuel H. Owens, Altoona, Pa.

Original application April 28, 1932, Serial No. 608,007. Divided and this application April 28, 1932. Serial No. 608,005

5 Claims. (Cl. 105—366)

This invention relates to movable seating abutments for container vehicles, and more particularly to abutments movable longitudinally of the platform of a railway car, motor truck or other vehicle intermediate the sides thereof and serving as seating and spacing members between adjacent containers mounted in spaced relation along the length of the platform. The present application constitutes a division of my pending application for U. S. Letters Patent, Serial No. 608,007 filed April 28, 1932, wherein there is described a complete assemblage of fixed and movable abutments for a railway car whereby the car is adapted for the carrying of containers of varying base dimensions. This invention is directed to the particular intermediate container seating abutments there disclosed, which are conveniently employed between adjacent containers to serve as stops and spacing members, preventing lengthwise shifting of such containers on their platform in transit, and causing the containers to be seated in proper spaced relation along the length of the vehicle.

The object of the invention is to provide in association with a vehicle platform a set of container seating abutments which have capacity for movement longitudinally of the platform and which are adapted to be locked to the platform at varying distances from the ends thereof, thus serving as seats for the accommodation of containers of varying length.

A more specific object of the invention is to provide in association with a vehicle platform seating abutments which are normally housed beneath the top surface of the vehicle platform, hence not obstructing the loading space thereof, but which are adapted to be guided vertically upward and to be shifted horizontally to operative positions above the floor of the vehicle, enabling the vehicle to be readily converted from ordinary use to the carrying of containers of varying length in the desired space relation along the length of the platform.

Other more specific objects and advantages characterizing my invention will become more fully apparent from the description hereinafter of one embodiment or example of the practice of the invention, having reference to the accompanying drawings, whereof;

Fig. I represents a plan view of one end portion of a railway flat car fitted with intermediate container seating abutments of my invention.

Fig. II represents a side elevation of the same.

Fig. III represents an enlarged plan view of a portion of a rack disposed longitudinally of the car and of an intermediate movable abutment associated with such rack.

Fig. IV represents a longitudinal cross sectional view of a portion of the rack of Fig. III, taken as indicated by the lines IV—IV of Fig. III, and showing the intermediate abutment in side elevation.

Fig. V represents a transverse cross sectional view of the rack, and a portion of the car platform, taken as indicated by the lines V—V of Fig. III, showing the intermediate abutment in end elevation.

Fig. VI represents a cross sectional view of an intermediate abutment taken as indicated by the lines VI—VI of Fig. VIII.

Fig. VII represents a cross sectional view of such an intermediate abutment taken as indicated by the lines VII—VII of Fig. VIII.

Fig. VIII represents a longitudinal cross section, taken as indicated by the lines VIII—VIII of Figs. VI and VII, showing the actuating handle of the intermediate abutment in partial cross section.

Fig. IX represents a perspective view of the actuating handle for the intermediate abutment shown in Figs. VII and VIII.

Fig. X represents a perspective view of a yoke forming a part of the intermediate abutment shown in Figs. VI, VII and VIII; and Fig. XI represents a perspective view of the form of dog used in the intermediate abutment of Figs. VI, VII and VIII.

With particular reference to Figs. I and II, it will be seen that the container vehicle selected for illustration as an example of an embodiment of my invention, comprises an ordinary railway flat car with the addition thereon of various types of abutments for defining seats for containers superimposed upon the platform 1 of the vehicle. Two containers of the type generally known as "demountable truck bodies" are illustrated in diagrammatic outline at A, such containers being of less width and greater length than the ordinary railway container.

In Figs. I and II of the drawings, there are shown mounted on the platform 1 of the railway car, various types of abutments, all of which serve as stops preventing shifting of containers on the floor of the car and also as guides facilitating the lowering of the containers into their proper positions. Such abutments are conveniently classified herein as the "fixed side abutments", which are designated at 2, the "fixed end corner abutments" designated at 3, the "movable side abutments", designated at 4, the "movable end corner abutments" designated at 5, and the "intermediate movable abutments" designated at 6. The present invention is directed entirely to the intermediate movable abutments. The remaining forms of abutments are described in detail in my pending application, hereinbefore referred to, and are therefore only briefly described in this application.

The fixed side abutments 2, together with the fixed end corner abutments 3, define a plurality of rectangular seats along the side edges of the vehicle for the accommodation of containers of standard dimensions, the car being primarily adapted for carrying containers of approximately the same width as the width of the car platform 1. The fixed side abutments 2 in each instance define oppositely directed corners 8 for engagement with adjacent corners of standard size containers. The fixed end corner abutments 3 each define a single corner for engagement with the corresponding corner of a container mounted at the end of the railway car. The movable side abutments 4 are adapted for transverse movement along the platform 1 of the vehicle toward the center line thereof to engage truck body containers such as shown at A which are of less width than the vehicle platform. The movable end corner abutments 5 are likewise adapted for transverse movement toward the center line of the platform to compensate for the changed position of the corners of the end containers when other than standard containers are used. In Fig. I there is indicated in broken lines at B the outline of the maximum width truck body container which can be accommodated on the vehicle.

The intermediate movable abutments 6 are normally housed beneath the floor of the car, but are adapted to be raised and shifted longitudinally intermediate the sides of the platform to serve as spacing members between adjacent ends of a series of containers A of the non-standard type.

The intermediate movable abutments 6 are guided for longitudinal movement along racks 42 which are inlaid in the car platform 1 and riveted thereto as clearly shown in Figs. I and V, there being two such racks employed in the present example of the invention. The racks 42 are riveted along their side flanges 43 to the top of flanges of the stringers 12 and of additional stringers 44 of the car underframe.

Each rack 42 has a double row of teeth 45 facing each other. The opposite sides of each rack are joined together by flat horizontal webs 46 which define with the sides a longitudinal channel along which an intermediate abutment 6 is guided for movement lengthwise of the car platform 1. At spaced intervals along each rack 42 there are rectangular openings 47 of a size permitting one of the intermediate abutments to be dropped therethrough to a position as indicated in broken lines in Figs. IV and V in which the abutment rests upon the lower flanges 48 of the stringers 12 and 44. The intermediate abutments 6 are normally housed within the rectangular openings 47 with their top surfaces below the top surface 11 of the car platform. A sufficient number of intermediate abutments 6 are provided at spaced intervals along the length of the car to take care of the maximum number of non-standard containers which the car is likely to carry. Moreover, while as shown in Fig. I, there is but one pair of intermediate abutments between successive containers A, it will be readily apparent that if it is desired to space the containers at a greater distance from each other this can be accomplished by bringing up another pair of intermediate abutments from beneath the car platform 1 so that there are two pairs of such abutments spaced as desired between adjacent containers.

The intermediate abutments, as shown in detail in Figs. VI, VII and VIII, each comprise a rectangular casing 49, with a top 50 bolted thereto, opposite pairs of dogs 51 pivoted for swinging movement within the casing, and actuating mechanism for causing the dogs 51 to swing outward for engagement with the top edges of a rack 42 or to be returned to housed position within the casing. At the base of the casing 49 there are laterally extending flanges 52 which project at each side beneath the teeth 45 of the rack 42 and prevent the intermediate abutment 6 from being removed from the car platform. When an intermediate abutment 6 is being shifted longitudinally upon its rack 42 the laterally extending flanges 52 slide freely in the channel formed between the horizontal webs 46 and the underside of the teeth 45. Immediately above the laterally extending flanges 52 the casing 49 is formed with teeth 53 which, as shown most clearly in Figs. III and IV, are of complementary shape to the teeth 45 of the rack 42 and are adapted to register with the latter teeth when the intermediate abutment 6 is in operative or fully elevated position.

The actuating mechanism for causing the dogs 51 to be moved inward or outward comprises generally an actuating handle 54, shown in perspective in Fig. IX and a yoke 55 shown in perspective in Fig. X. The actuating handle 54 includes an upper bowl 56 having a hand grip 57 across the top thereof and a lower cylindrical portion 58 helically grooved as indicated at 59. The yoke 55 includes an annulus 60 adapted to accommodate the actuating handle 54 and having opposite lugs 61 which work in the helical groove 59. The actuating handle 54 is restrained against vertical movement by means of a shoulder 62 on the casing top 50. At the base of the cylindrical portion 58 there is provided a journal 63 which fits within a bearing 64 in the base of the casing 49. Consequently a turning movement of the actuating handle 54 causes the yoke 55 to move upward or downward within the casing 49, according to the direction of turning, through the action of the lugs 61 riding the helical groove 59. The yoke 55 is held against rotation and guided in its vertical travel by long bolts 65 which pass through the casing at the sides thereof. As shown in Fig. X, the yoke 55 has wing portions 66 which are notched at their extremities, as indicated at 67, the notches fitting around the bolts 65.

The swinging dogs 51 each include cylindrical portions 68 normally fulcrumed on curved seats 69 at the sides of the casing 49. The dogs 51 are freely mounted and are readily removable. Each dog 51 has near the base thereof an inwardly projecting angular formation or butt 70 adapted to be engaged by the lower edge 71 of the adjacent wing portion 66. Near the top of the dog 51 there is a curved projection or toe 72 adapted to be engaged by the upper edge 73 of the adjacent wing portion 66. Thus when the yoke 55 is raised or lowered in the casing 49 the dogs 51 are caused to be swung inward or outward respectively. When swung outward the outwardly projecting portions 74 engage the rack 42 at the top edges of the teeth 45 as shown in Fig. V.

Outward swinging of the opposite pairs of dogs 51 is caused by downward movement of the yoke 55 within the casing 49. As the yoke 55 moves downward the lower edges 71 of the wing portions 66 strike the butts 70 of the dogs and force the same outward through the openings 75 at the sides of the casing 49. When thus extended the strain is relieved from the curved seats 69 and taken up by seats 76 at the base of the casing 49. When the yoke 55 is moved upward by turning the actuating handle in the opposite direction the upper edges 73 of the wing portions 66 strike the toes 72 of the dogs 51 and cause them to be swung inward to their original positions.

It will be noted that the various movable parts of the intermediate abutments may be made as rough castings, rather than machined parts, and may be readily assembled and disassembled.

From the above description of the intermediate container seating abutments 6 it will be apparent that these abutments may rest in any one of three vertical positions. The intermediate abutments 6 are normally housed within the openings 47, which are located at intervals along the racks 42, beneath the top surface 11 of the car platform 1. When it is desired to employ an intermediate abutment 6 for the spacing of non-standard containers on the platform, the abutment is raised from its housing and shifted longitudinally within the channel formed above the horizontal webs 46 of the racks 42 to the desired distance from the ends of the car, or, if the container be seated, to the end wall of the container. The operator then raises the abutment 6 by grasping the hand grip 57 and guiding the teeth 53 at the sides of the abutment through the teeth 45 at opposite sides of the rack 42. When the abutment has thus been raised to fully elevated position the actuating handle is turned to project the lugs 74 outward to engagement with the top edges of the rack 42, thus locking the abutment.

From the above description it will also be apparent that when a railway flat car such as shown in the drawings is to be used for the transportation of standard size containers, all of the movable abutments are housed outside of the normal loading space of the car, the movable side abutments 4 being housed within the fixed side abutments 2, the movable end corner abutments 5 being swung outward at the ends of the car, and the movable intermediate abutment 6 being housed beneath the car platform 1. When the movable abutments are thus housed the car has an unobstructed floor space and may be used as an ordinary flat car for other purposes than the carrying of containers. On the other hand, when it is desired to carry truck body containers, such as indicated at A, or other containers of less width or of greater length than the standard type, the various movable abutments are shifted in the manner described to define seats for accommodating the containers in the desired spaced relation.

While I have described a railway car fitted with a special form of movable abutment of my invention, it will be apparent that the invention is not confined to railway cars, but may be applied to other types of container carrying vehicles; and that the specific form of abutment herein illustrated and described may be varied to considerable extent as to its form location and method of operation, all without departing from the spirit of my invention as defined in the claims annexed hereto.

Having thus described my invention, I claim:

1. In a container carrying vehicle, a platform, a rack inlaid longitudinally in said platform flush with the top thereof, a channel underlying said rack, an abutment movable in said channel, said abutment having teeth for engagement with teeth on said rack, and a movable dog for maintaining said teeth in engagement to lock said abutment on said rack, said rack having openings at intervals through which said abutment may be dropped to housed position below the top surface of said platform.

2. In a container carrying vehicle, a platform, a rack inlaid longitudinally in said platform near the top thereof, an abutment guided for movement beneath said rack, said abutment having teeth for engaging with the teeth on said rack when said abutment is raised, a movable dog for locking said teeth in engagement whereby said abutment is held against movement on said rack, means for operating said movable dog, an opening in said rack, and means whereby said abutment may be guided into said opening and there lowered to a position beneath the top surface of the platform.

3. In a container carrying vehicle, a platform, a rack on said platform, a container seating abutment guided for horizontal movement beneath said rack and adapted for limited upward movement, said abutment having teeth for engaging with the teeth on said rack when said abutment is raised, a movable dog for holding said abutment in a raised position with said teeth in engagement whereby said abutment is held against movement on said rack, and a handle for raising said abutment and for actuating said movable dog by its rotation.

4. In a container carrying vehicle, a platform, a rack on said platform, a container seating abutment guided for movement beneath said rack and adapted for limited movement upward and downward, said abutment having teeth for engaging with the teeth on said rack when said abutment is raised, a movable dog adapted to be extended to hold said abutment in a raised position and to maintain said teeth in engagement whereby said abutment is held against movement on said rack, said abutment having a seat upon which said dog is freely mounted for pivotal movement and having a second seat for taking the strain from the first seat when said dog is extended, and a handle for raising said abutment and for actuating said movable dog.

5. In a container carrying vehicle, a platform, a channel extending longitudinally along said platform throughout the major portion thereof and beneath its top surface, openings at intervals of the length of said channel, a plurality of container seating abutments guided for independent longitudinal movement within said channel, means whereby said abutments may be locked within said channel at varying distances from the ends of the platform, housings for said seating abutments disposed beneath the openings in said channel, and means for guiding said seating abutments vertically through said openings to said housings beneath the platform.

SAMUEL H. OWENS.